2,790,809

PROCESS FOR THE MANUFACTURING OF
ANTHRAQUINONE VAT DYESTUFFS

Maurice Grelat, Basel, Switzerland, assignor to Ciba Limited, Basel, Switzerland, a Swiss firm No Drawing. Application October 26, 1953,
Serial No. 388,419

Claims priority, application Switzerland
November 13, 1952

14 Claims. (Cl. 260—316)

This invention is based on the observation that anthraquinone vat dyestuffs can be made in an especially advantageous manner by the carbazolization of anthrimides, if the anthramide, which is built up exclusively of anthraquinone nuclei, is treated with a halogenating agent prior to the carbazolization.

As anthrimides, which are built up exclusively of anthraquinone nuclei, there are to be understood anthrimides which contain no other ring systems, for example, no benzene, naphthalene or heterocyclic rings, bound to an anthraquinone radical either by a simple bond or in the form of a ring fused on to an anthraquinone radical. There come into consideration more especially linear polyanthrimides, and among these the anthrimides which contain 4–6 anthraquinone nuclei are of special interest. As linear polyanthrimides there come into consideration anthrimides which are built up of at least three anthraquinone nuclei, and in which all the anthrimide bonds as represented in the formula as normally written lie in a straight line. This is the case when the anthrimide bonds are in 1:4-position relatively to one another, so that the 4-position of one anthraquinone nucleus is bound to the 1-position of the next anthraquinone nucleus by a —NH— group. It is of special advantage to use polyanthrimides of this kind, which are free from acylamino groups and are completely free from further substituents, for example, those of the formula

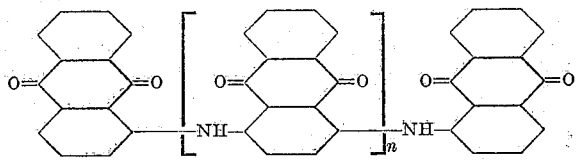

in which $n$ represents a whole number from 2 to 4.

However there may also be used in the present process as starting materials non-linear polyanthrimides such, for example, as 1:4:5-tri-($\alpha$-anthraquinonylamino)-anthraquinone or 1:4:5:8 - tetra - ($\alpha$ - anthraquinonylamino)-anthraquinone.

The polyanthrimides can be made by methods in themselves known. Thus, linear tetranthrimide, that is to say 1:1'-4':1''-4'':1'''-tetranthrimide, can be made in known manner by condensing 1 mol of 4:4'-diamino-1:1'-dianthrimide with 2 mols of 1-chloranthraquinone. Linear pentanthrimide can be made by condensing 2 mols of 4-amino-1:1'-dianthrimide with 1 mol of 1:4-dichloranthraquinone, and linear hexanthrimide can be made by condensing 1 mol of 4-amino-1:1'-4':1''-trianthrimide with 1 mol of 4-chloro-1:1'-4':1''-trianthrimide.

The condensation reactions leading to the formation of the polyanthrimides may be carried out by the usual methods. They may be carried out, for example, in a high boiling solvent or dispersing medium such as nitrobenzene, ortho-dichlorobenzene or naphthalene, with the addition of an acid-binding agent such as sodium carbonate or sodium acetate, and also with catalytic quantities of copper salts. In some cases, for example, in the condensation of 4:4'-diamino-1:1'-dianthramide with 1-chloranthraquinone, it is possible to work with a very limited quantity of a suitable dispersing medium such, for example, as naphthalene, for example, with a quantity which amounts to only a fraction of the substances to be reacted together, provided that there is used as the reaction vessel an apparatus capable of being heated, which exerts on the material to be treated, which is present, for example, in the form of a more or less thick paste, a grinding and mixing action.

An especially advantageous apparatus of this kind is the agitator batch dryer (see Thorpe's Dictionary of Applied Chemistry 4th edition, vol. IV, page 74).

As halogenating agents for use in the present process there come into consideration, for example, brominating agents such as bromine or advantageously chlorinating agents. Among the latter sulfuryl chloride has been found especially advantageous.

The treatment with the halogenating agent may be carried out either without any intermediate separation, that is to say, directly following condensation to form the polyanthrimide, or as a separate process step after having previously separated the polyanthrimide. The choice of the method in any particular case, depends, apart from the constitution of the polyanthrimide, also on the nature of the solvent or dispersing medium used for the condensation, the most important consideration being whether the solvent or dispersing medium is relatively stable to the halogenating agent as, for example, in the case of nitrobenzene, chlorobenzene or ortho-dichlorobenzene, or whether it reacts easily with such agents as in the case of naphthalene. When sulfuryl chloride is used it is generally of advantage to carry out the treatment in an organic inert solvent, advantageously at a raised temperature, for example, at a temperature within the range of 50° C. to 100° C., to add an agent which assists the halogenation, for example, a small amount of iodine, and to allow the halogenating agent to act for a prolonged period, advantageously for a few hours. Depending on the choice of the reaction conditions and on the quantity of the halogenating agent, the reaction can be made weaker or stronger, which mainly results in a lower or higher halogen content in the polyanthrimide, but also exerts a substantial influence on the properties of the carbazole obtainable from such polyanthrimide. It is of advantage in the treatment of polyanthrimides, especially linear tetranthrimide, with sulfuryl chloride to use about 2-3 mols of the halogenating agent per mol of anthrimide. In this manner there is generally obtained a halogen content approximately corresponding to a monohalogenated tetranthrimide, but the halogen compound may of course be lower or higher (for example, 0.7 to 1.2 atomic proportions of chlorine per molecular proportion of tetranthrimide).

For the carbazolization there may be used more especially the various known combinations of aluminum chloride with fluxing agents, it being uncertain in individual cases how far the fluxing agents form molecular compounds with aluminum chloride. As such fluxing agents there may be mentioned aromatic compounds such as nitrobenzene, inorganic compounds such as sulfur trioxide, if desired alone or in admixture with one another. In the case of linear polyanthrimides advantageous results are usually obtained with the use of aluminum chloride with an addition of a tertiary base, for example, a tertiary base free from hydroxyl groups such, for example, as triethylamine. Especially suitable, however, are cyclic bases such, for example, as quinoline or acridine and above all pyridine bases such as pyridine proper or its next higher homologues, for example, methyl-pyridine such as $\alpha$-picoline or mixtures of pyridine bases such as the commercial $\beta$:$\gamma$-picoline mixture.

The carbazolization of the polyanthrimides is advantageously carried out at temperatures within the range of about 120–180° C. When pyridine and aluminum chloride are used a temperature of about 140° C. is especially advantageous, whereas the use, for example, of picolines, enables the reaction to be carried out at a higher temperature (up to about 180° C.). Depending on the choice of the condensing agent and the reaction temperature, differences in the properties of the products obtained, for example, differences with regard to the tints of the vat dyeings obtained with the products, other than differences arising from variations in the treatment with the halogenating agent, can be produced.

The reaction mixtures can usually be worked up, for example, by rendering the reaction mixture alkaline with an alkali hydroxide after diluting it with water, and adding a suitable reducing agent, such as sodium hydrosulfite, vatting the dyestuff so obtained, and then precipitating it by oxidation, for example, by means of air. Instead of vatting the dyestuff, it may for the purpose of purification, after pouring it into water, be treated with an oxidizing agent such as sodium hypochlorite.

The dyestuff so obtained can be used in the same manner as the corresponding dyestuffs obtained by known methods, that is to say, without the treatment with a halogenating agent, for example, as pigments, for dyeing or printing cellulose-containing fibers, if desired, in the form of sulfuric acid leuco-ester salts obtainable therefrom by known methods.

As stated above the dyestuffs obtainable by the present process differ from those obtained by known methods without treating the anthrimide with a halogenating agent, in certain properties. In some cases, especially in the case of the carbazole obtainable from linear tetranthrimide, the products of the present process yield valuable tints or better uniformity of tint as between dyeings on different fibers, for example, fibers of natural and regenerated cellulose. Moreover, better properties of fastness may be observed.

This is especially surprising, because the carbazoles obtainable by the present process, in contradistinction to the anthrimides (see the above remarks), still have only a very small content of halogen, which, even when it is assumed that it is not a question of halogen-containing impurities, but of halogen-substitution in the final product, cannot acount for the difference in properties. Probably the halogenated polyanthrimides may be more easily or more completely carbazolized than the corresponding non-halogenated polyanthrimides. However, the difference in the course of the carbazolization, which ocurs in this case apparently with the splitting off of halogen or hydrogen halide, could not have been foreseen.

The following examples illustrate the invention, the parts and percentages being by weight unless otherwise stated and the relationship of parts by weight to parts by volume being the same as that of the kilogram to the liter:

*Example 1*

61 parts of 4:4'-diamino-1:1'-dianthrimide, 64.5 parts of 1-chloranthraquinone, 40 parts of anyhdrous sodium carbonate, 6 parts of cuprous chloride and 1600 parts of nitrobenzene are heated at the boil for 8–10 hours. The whole is then allowed to cool to 60° C. 45 parts of sulfuryl chloride are added, and the whole is stirred at 70–80° C. for 5 hours. The mixture is then filtered with suction, the filter residue is washed with nitrobenzene, and treated with steam until nitrobenzene no longer distils off. The residue is then filtered off with suchtion, washed with water and dried. There is obtained a dark violet powder, which dissolves in concentrated sulfuric acid with a green coloration. A product prepared in this manner contained 2.54 percent of chlorine.

The chlorinated 1:1'-4':1''-4'':1'''-tetranthrimide is carbazolized as follows: 25 parts of aluminum chloride are introduced into 60 parts of anhydrous pyridine, while stirring and raising the temperature from 10° to 100° C. At 100° C. there are added 5 parts of the product described in the first paragraph of this example. In the course of 45 minutes the temperature is raised to 140–142° C., during which some pyridine distils off. The whole is stirred at 140–142° C. for one hour, and the reaction mixture is poured into cold water. To the resulting suspension are added 120 parts of sodium hydroxide solution of 30 percent strength and 50 parts of sodium hypochlorite solution containing 12% of active chlorine. The mixture is heated up to 90° C., and stirred for one hour at that temperature, then filtered with suction, and the filter residue is washed neutral with water and dried. The dyestuff is a dark powder which dissolves in concentrated sulfuric acid with a brown black coloration and dyes cotton from a brown vat fast neutral grey tints. Analysis of a dyestuff obtained in this manner showed a chlorine content of 0.8 percent.

When 1:1'-4':1''-4'':1'''-4''':1''''-pentanthrimide is used as starting material instead of the tetranthrimide there is also obtained a dyestuff which dyes cotton in fast grey tints.

*Example 2*

66 parts of 4:4'-diamino-1:1'-dianthrimide, 70 parts of 1-chloranthraquinone, 4 parts of cuprous chloride, 30 parts of anhydrous sodium carbonate and 800 parts of naphthalene are stirred for 8 hours at 210–212° C. The reaction mixture is allowed to cool to 140° C. At that temperature the melt is diluted with 800 parts of chlorobenzene. The mixture is filtered with suction at 100–110° C. and washed with chlorobenzene. The filter residue is then steam distilled until chlorobenzene or naphthalene no longer escape. The mixture is then filtered with suction, and the filter residue is washed with water until neutral and dried. The product is a dark violet powder, which dissolves in concentrated sulfuric acid with a green coloration. A product so obtained had a chlorine content of 0.33 percent.

60 parts of the tetranthrimide described in the first paragraph of this example are suspended in 800 parts of nitrobenzene. To the resulting suspension are added 22 parts of sulfuryl chloride and 0.1 part of iodine. The reaction mixture is then stirred for 5 hours at 60–70° C., then filtered with suction, and the filter residue is washed with nitrobenzene. The filter residue is steam distilled until nitrobenzene no longer escapes. The mixture is then filtered with suction, and the filter residue is washed with water and dried. A product prepared in this manner contained 2.55 percent of chlorine.

The resulting chlorine-containing tetranthrimide is carbazolized in the manner described in the second paragraph of Example 1. The dyestuff is a dark powder, which has properties similar to those of the dyestuff of Example 1. A dyestuff prepared in this manner was found to have a chlorine content of 0.29 percent.

*Example 3*

60 parts of the tetranthrimide described in the first paragraph of Example 2 are suspended in 800 parts of ortho-dichlorobenzene. To the resulting suspension there are added 22 parts of sulfuryl chloride and 0.1 part of iodine. The reaction mixture is stirred for 5 hours at 60–70° C., filtered with suction and the filter residue is washed with ortho-dichlorobenzene. The filter residue is then steam distilled until ortho-dichlorobenzene no longer escapes. The mixture is filtered with suction, and the filter residue is washed with water and dried. A product obtained in this manner was found to have a chlorine content of 3.26 percent.

The chlorine-containing tetranthrimide is carbazolized in the manner described in the second paragraph of Example 1. The dyestuff is a dark powder which dyes cotton grey tints having a somewhat more olive shade than the dyestuff obtainable as described in the second paragraph of Example 1. A dyestuff carbazolized in this manner had a chlorine content of 0.3 percent.

*Example 4*

66 parts of 4:4'-diamino-1:1'-dianthrimide, 70 parts of 1-chloranthraquinone, 4 parts of cuprous chloride, 45 parts of anhydrous sodium carbonate and 50 parts of naphthalene are heated in an agitator batch dryer, while stirring, at an external temperature of 230–240° C. This temperature is maintained for 3 hours. After being cooled, the reaction mixture is distilled with steam until naphthalene no longer escapes. The mixture is then filtered with suction, and the filter residue is washed with water and dried. A tetranthrimide obtained in this manner contained 0.35 percent of chlorine.

50 parts of the tetranthrimide obtained as described in the first paragraph of this example are suspended in 600 parts of chlorobenzene. To the resulting suspension are added 20 parts of sulfuryl chloride and 0.1 part of iodine, and the whole is stirred for 5 hours at 70–80° C. The mixture is then filtered with suction, and the filter residue is washed with chlorobenzene. The filter residue is distilled with steam until chlorobenzene no longer escapes. The mixture is then filtered with suction, and the filter residue is washed with water and dried. The product is a dark violet powder. A product obtained in this manner had a chlorine content of 4.7 percent.

The resulting chlorine-containing tetranthrimide is then carbazolized as described in the second paragraph of Example 1. The dyestuff dyes cotton grey tints having a more olive shade than those of the dyestuff obtainable as described in the second paragraph of Example 1. A dyestuff prepared in this manner had a chlorine content of 0.4 percent.

*Example 5*

50 parts of the tetranthrimide obtained as described in the first paragraph of Example 4 are suspended in 600 parts of chlorobenzene. To the suspension are added 15 parts of sulfuryl chloride and 0.1 part of iodine, and the whole is stirred for 2½ hours at 50–60° C. The mixture is then filtered with suction, and the filter residue is washed with chlorobenzene. The filter residue is distilled with steam until chlorobenzene no longer escapes. The mixture is then filtered with suction, and the filter residue is washed with water and dried. A product prepared in this manner contained 4.1 percent of chlorine.

The resulting chlorine-containing tetranthrimide is then carbazolized in the manner described in the second paragraph of Example 1. The dyestuff is a dark powder which has properties similar to those of the dyestuff of Example 1 and also contains less than ½ percent of chlorine.

*Example 6*

25 parts of the tetranthrimide described in the first paragraph of Example 2 are suspended in 200 parts of 1:2:4-trichlorobenzene. To the suspension there is added 0.1 part of iodine and 15 parts of bromine are introduced dropwise at 70–80° C. in the course of 2½ hours. The reaction mixture is stirred for 2 hours at 70–80° C., and then filtered while hot. The filter residue is washed with 100 parts of 1:2:4-trichlorobenzene, then distilled with steam until trichlorobenzene no longer escapes. The mixture is filtered with suction, and the filter residue is washed with water and dried. A product so obtained had a bromine content of 17 percent.

This bromine-containing tetranthrimide is carbazolized in the manner described in the second paragraph of Example 1. The dyestuff is a dark powder, which dyes cotton grey tints. A dyestuff carbazolized in this manner had a bromine content of 3.7 percent.

*Example 7*

10 parts of 1:4:5-tri-($\alpha$-anthraquinonylamino)-anthraquinone are suspended in 120 parts of chlorobenzene. To the suspension are added 0.1 part of iodine and 4.6 parts of sulfuryl chloride. The reaction mixture is stirred for 5 hours at 70–80° C. and then filtered with suction while hot. The filter residue is washed with 50 parts of chlorobenzene and distilled with steam until chlorobenzene no longer escapes. The mixture is then filtered with suction and the filter residue is washed with water and dried. A product obtained in this manner had a chlorine content of 7.3 percent.

4 parts of the tetranthrimide chlorinated in this manner and 2 parts of sodium carbonate are thoroughly mixed. The mixture is introduced into a melt of 50 parts of aluminum chloride and 6.5 parts of dry sodium chloride at 180° C. The temperture is then raised to 200–210° C. and the mixture stirred at this temperature for 30 minutes. The melt is then introduced into 500 parts of water. The reaction mass is suction-filtered and the residue washed with water. It is then pasted with about 1000 parts of sulfuric acid of 10 percent strength. To this suspension are added 5 parts of sodium bicarbonate and the whole is stirred for 2 hours at 90–100° C. The reaction mass is suction-filtered, washed neutral with water, and dried. The resulting dyestuff is a dark powder which dissolves in sulfuric acid with a dark violet coloration and dyes cotton fast brown tints. The chlorine content of the product prepared in this manner is 1 percent.

*Example 8*

25 parts of crude 1:4:5:8 - tetra - ($\alpha$ - anthraquinonylamino)-anthraquinone are suspended in 300 parts of chlorobenzene. To the suspension are added 0.1 part of iodine and 11.5 parts of sulfuryl chloride. The reaction mixture is stirred for 2 hours at 70–80° C. and then filtered with suction while hot. The filter residue is washed with 100 parts of chlorobenzene, and then distilled with steam until chlorobenzene no longer escapes. The mixture is then filtered with suction, and the filter residue is washed with water and dried. A product obtained in this manner had a chlorine content of 4.7 percent.

5 parts of the resulting chlorine-containing pentanthrimide are introduced at 120° C. into a melt of 50 parts of aluminum chloride and 7 parts of sodium chloride. The temperature is raised to 145° C., and stirred at 145–150° C. for ¾ hour. The melt is then poured on to 200 parts of ice. There are added 120 parts of sodium hydroxide solution of 35 percent strength and 50 parts of sodium hypochlorite (containing 12 percent of active chlorine), and the whole is stirred for 30 minutes at 90–95° C. The mixture is then filtered with suction, and the filter residue is washed with water and dried. The dyestuff is a dark powder which dyes cotton khaki tints. A dyestuff prepared in this manner had a chlorine content of 1.6 percent.

*Example 9*

1.5 parts of the dyestuff obtained as described in the last paragraph of Example 1 are vatted with 6 parts by volume of sodium hydroxide solution of 30 percent strength and 3 parts of sodium hydrosulfite in 100 parts of water at 40–50° C. The resulting stock vat is added to a dyebath which contains in 2000 parts of water 6 parts by volume of sodium hydroxide solution of 30 percent strength and 3 parts of sodium hydrosulfite, and 100 parts of cotton are entered at 40° C. After 15 minutes, there are added 20 parts of sodium chloride, and dyeing is carried on at 40–50° C. for one hour. Then the cotton is squeezed, oxidized and prepared in the usual manner. It is dyed a fast neutral grey tint.

What is claimed is:

1. Process for the manufacture of anthraquinone vat dyestuffs by carbazolization of an anthrimide which is built exclusively of anthraquinone nuclei, which process comprises treating an anthrimide which contains at least 4 anthraquinone nuclei bound together by —NH-bridges with a halogenating agent before it is subjected to carbazolization and splitting off so-introduced halogen as hydrogen halide during the carbazolization.

2. Process for the manufacture of anthraquinone vat dyestuffs by carbazolization of an anthrimide which is built exclusively of anthraquinone nuclei, which process comprises treating an anthrimide which contains at least 4 anthraquinone nuclei bound together by —NH-bridges in an inert organic solvent with a chlorinating agent before it is subjected to carbazolization and splitting off so-introduced chlorine as hydrogen chloride during the carbazolization.

3. Process for the manufacture of anthraquinone vat dyestuffs by carbazolization of an anthrimide which is built exclusively of anthraquinone nuclei, which process comprises treating an anthrimide which contains at least 4 anthraquinone nuclei bound together by —NH-bridges in an inert organic solvent with sulfuryl chloride before it is subjected to carbazolization and splitting off so-introduced chlorine as hydrogen chloride during the carbazolization.

4. Process for the manufacture of anthraquinone vat dyestuffs by carbazolization of an anthrimide which is built exclusively of anthraquinone nuclei, which process comprises treating an anthrimide which contains at least 4 anthraquinone nuclei bound together by —NH-bridges in an inert organic solvent and in the presence of a catalytic quantity of iodine with sulfuryl chloride before it is subjected to carbazolization and splitting off so-introduced chlorine as hydrogen chloride during the carbazolization.

5. Process for the manufacture of anthraquinone vat dyestuffs by carbazolization of an anthrimide which is built exclusively of anthraquinone nuclei, which process comprises treating an anthrimide which contains at least 4 anthraquinone nuclei bound together by —NH-bridges in an inert organic solvent with bromine before it is subjected to carbazolization and splitting off hydrogen halide during the carbazolization.

6. Process for the manufacture of anthraquinone vat dyestuffs by carbazolization of an anthrimide which is built exclusively of anthraquinone nuclei, which process comprises treating an anthrimide which contains at least 4 anthraquinone nuclei bound together by —NH-bridges in an inert organic solvent and in the presence of a catalytical quantity of iodine with bromine before it is subjected to carbazolization and splitting off hydrogen halide during the carbazolization.

7. Process for the manufacture of anthraquinone vat dyestuffs by carbazolization of an anthrimide which is built exclusively of anthraquinone nuclei, which process comprises treating an anthrimide of the formula

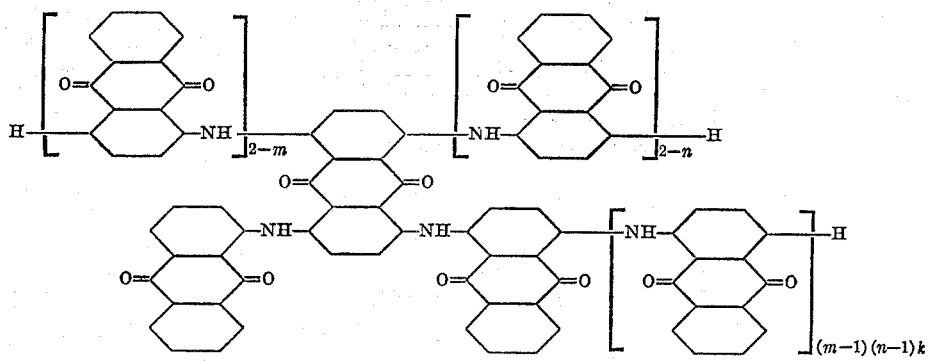

wherein $k$, $m$ and $n$ each represents a whole number of at the most 2, in an inert organic solvent with a halogenating agent before it is subjected to carbazolization and splitting off so-introduced halogen as hydrogen halide during the carbazolization.

8. Process for the manufacture of anthraquinone vat dyestuffs by carbazolization of an anthrimide which is built exclusively of anthraquinone nuclei, which process comprises treating a linear polyanthrimide which contains at least 4 anthraquinone nuclei bound together by —NH-bridges in an inert organic solvent and in the presence of a catalytic quantity of iodine with sulfuryl chloride before it is subjected to carbazolization and splitting off so-introduced chlorine as hydrogen chloride during the carbazolization.

9. Process for the manufacture of anthraquinone vat dyestuffs by carbazolization of an anthrimide which is built exclusively of anthraquinone nuclei, which process comprises treating the anthrimide of the formula

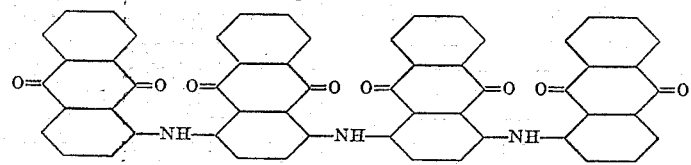

in an inert organic solvent and in the presence of a catalytical quantity of iodine with sulfuryl chloride before it is subjected to carbazolization and splitting off so-introduced chlorine as hydrogen chloride during the carbazolization.

10. Process for the manufacture of anthraquinone vat dyestuffs by carbazolization of an anthrimide which is built exclusively of anthraquinone nuclei, which process comprises treating the anthrimide of the formula

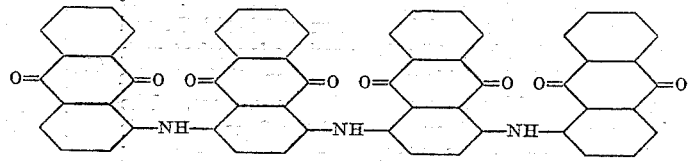

in an inert organic solvent and in the presence of a catalytical quantity of iodine with bromine before it is subjected to carbazolization and splitting off hydrogen halide during the carbazolization.

11. Process for the manufacture of anthraquinone vat dyestuffs by carbazolization of an anthrimide which is built exclusively of anthraquinone nuclei, which process comprises treating the anthrimide of the formula

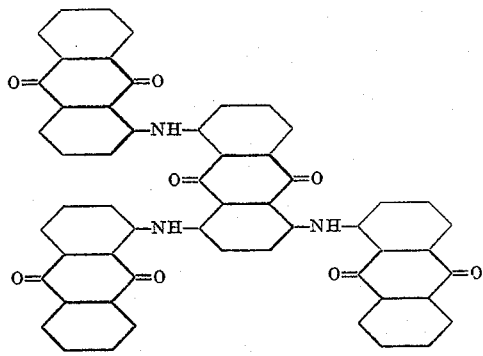

in an inert organic solvent and in the presence of a catalytic quantity of iodine with sulfuryl chloride before it is subjected to carbazolization and splitting off so-introduced chlorine as hydrogen chloride during the carbazolization.

12. Process for the manufacture of anthraquinone vat dyestuffs by carbazolization of an anthrimide which is built exclusively of anthraquinone nuclei, which process comprises treating the anthrimide of the formula

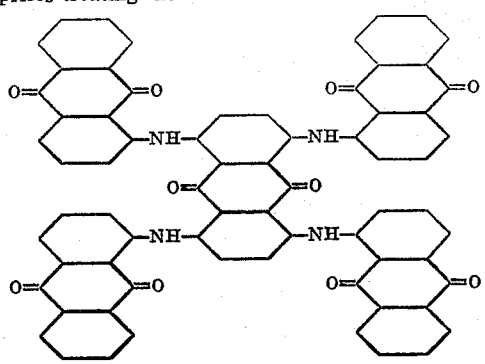

in an inert organic solvent and in the presence of a catalytical quantity of iodine with sulfuryl chloride before it is subjected to carbazolization and splitting off so-introduced chlorine as hydrogen chloride during the carbazolization.

13. In a process for the manufacture of anthraquinone vat dyestuffs by carbazolization of an anthrimide which is built up exclusively of anthraquinone nuclei the improvement which comprises treating the anthrimide with a halogenating agent before it is subjected to carbazolization and splitting off so-introduced halogen as hydrogen halide during the carbazolization.

14. An anthrimide which is substituted per molecular proportion by 0.7 to 1.2 atomic proportions of halogen and otherwise corresponds to the formula

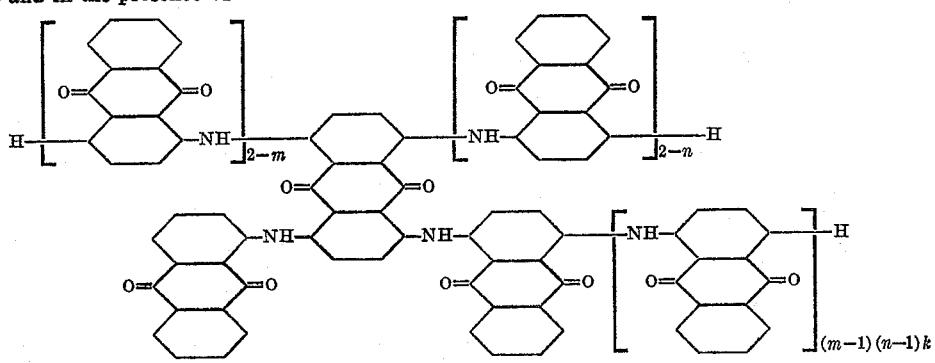

wherein $k$, $m$ and $n$ each represents a whole number of at the most 2.

References Cited in the file of this patent
UNITED STATES PATENTS

| | | |
|---|---|---|
| 1,912,378 | Lulek | June 6, 1933 |
| 2,030,253 | Hauser et al. | Feb. 11, 1936 |
| 2,111,092 | Dettwyler | Mar. 15, 1938 |
| 2,151,635 | Dettwyler | Mar. 21, 1939 |
| 2,203,227 | Lulek et al. | June 4, 1940 |
| 2,227,664 | Mieg et al. | Jan. 7, 1941 |
| 2,539,193 | Kern | Jan. 23, 1951 |